Figure 1:
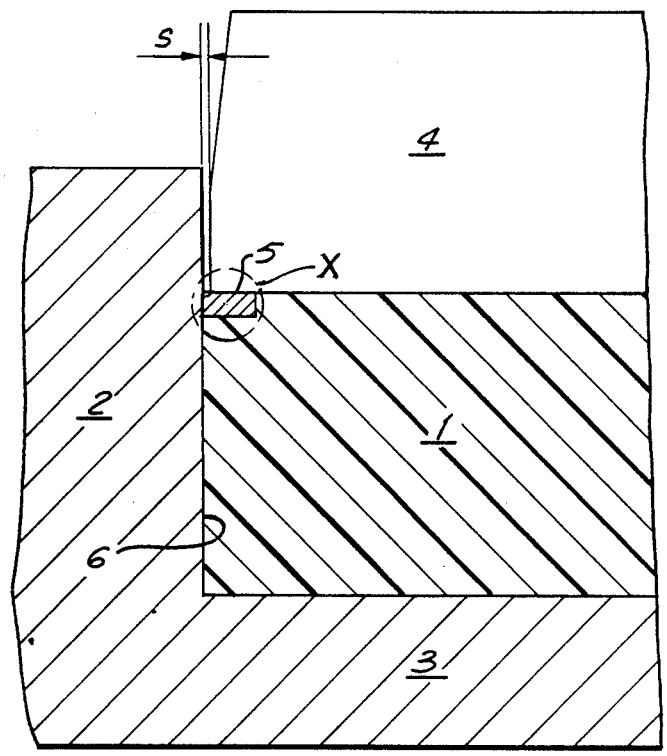

United States Patent [19]

Bayer et al.

[11] Patent Number: 4,955,098
[45] Date of Patent: Sep. 11, 1990

[54] POT-SHAPED SUPPORT FOR STRUCTURES, ESPECIALLY BRIDGE STRUCTURES

[75] Inventors: deceased Bayer, late of Grosserlach, by Gloria Bayer, executor; Hans Beutler, Munich, both of Fed. Rep. of Germany

[73] Assignee: Schwäbische Hüttenwerke GmbH, Aalen-Wasseralfingen, Fed. Rep. of Germany

[21] Appl. No.: 326,386

[22] Filed: Mar. 21, 1989

[30] Foreign Application Priority Data

Mar. 21, 1988 [EP]  European Pat. Off. ........ 88104510.8

[51] Int. Cl.$^5$ ............................................. E01D 19/00
[52] U.S. Cl. .................................................... 14/16.1
[58] Field of Search ............... 248/560, 615, 618, 632, 248/633, 634, 638, 188.1; 52/167; 14/16.1

[56] References Cited

U.S. PATENT DOCUMENTS

| | | | |
|---|---|---|---|
| 3,728,752 | 4/1973 | Andra | 14/16.1 |
| 3,782,789 | 1/1974 | Koestes | 14/16.1 |
| 3,934,295 | 1/1976 | Kosten | 14/16.1 |

FOREIGN PATENT DOCUMENTS

| | | | |
|---|---|---|---|
| 1901771 | 11/1970 | Fed. Rep. of Germany | 14/16.1 |
| 2242820 | 3/1974 | Fed. Rep. of Germany | 14/16.1 |
| 3014747 | 9/1981 | Fed. Rep. of Germany | 14/16.1 |
| 3616250 | 11/1986 | Fed. Rep. of Germany | 52/167 |

*Primary Examiner*—Ramon O. Ramirez
*Assistant Examiner*—Robert A. Olson
*Attorney, Agent, or Firm*—Toren, McGeady & Associates

[57] ABSTRACT

Pot or bowl-shaped support for structures, especially bridge structures, consisting of a pot for receiving a pressure pad from an elastomer upon which rests a lid, which transmits the load of the structure or the bridge resting upon it to a foundation, abutment or pillar or the like, and in which an annular gap between the lid and the pot wall is sealed by means of an annular seal, where the annular seal is designed as a open, single part compact ring with rectangular cross-section which consists of a PTFE-material with amorphous consistency filled with a powdery substrate. Herein the share of the filler substrate amounts preferably to between 15 and 40% of the total volume of the annular seal and the filler substrate has a share of 50 to 100% of pulverized coal.

7 Claims, 1 Drawing Sheet

U.S. Patent

Sep. 11, 1990

4,955,098

POT-SHAPED SUPPORT FOR STRUCTURES, ESPECIALLY BRIDGE STRUCTURES

The invention is directed to a pot-shaped support for structures, especially bridge structures. Supports of this type comprise essentially a pot for receiving a pressure pad from an elastomer, on which rests a lid, which transmits the weight of the structure or the bridge resting upon it to a foundation, an abutment, a pillar or the like, where the support is installed.

It is known that elastomers, when subjected to a high pressure in the pot or bowl of 20 to 40 N/mm$^2$ have a tendency to behave like a liquid; because of which they tend to penetrate into the annular gap between the inner wall of the pot and the lid and in extreme cases exit towards the top. In order to avoid this a peripheral annular seal is inserted between the pot and the lid, which is received in an annular groove configured in the elastomeric plate and which comes to rest against the inner wall of the pot.

In the past one initially used hard chrome-plated steel piston rings and later metallic material for these seals, preferably brass. Instead of an annular cross-section of for instance 6 mm in height and 10 mm in width, one changed over to several superimposed rings consisting of brass seals, which had the advantage that in case of tilting motions not only one edge rather three edges came to abut against the wall of the pot, because a cross-section of 10×6 mm is several times stiffer in torsion than three times the cross-section of 10×2 mm. In order to impart a spring-like elasticity to the brass seals, one provided them with equally spaced slots on their inner side. Sealing rings which were alternately slotted on the inside and outside in meandering fashion were also utilized. It was, however, seen that these metal sealing rings were indeed able to largely prevent the squeeze through of the ring part edge of the elastomeric plate through the annular groove between pot and lid, however one was obliged to accept the disadvantage of wear through sliding along the wall of the pot (up to the socalled "fretting" "scuffing") and with it the failure of the seal.

In order to avoid these disadvantages one began to use sealing rings of different plastic materials, as for instance of polyamide, acetal resin, polymethylene oxide (POM) and polytetrafluoroethylene (PTFE), wherein scuffing at the pot wall could be avoided and the arising friction could be reduced. The disadvantage with these sealing rings was however that the seals deformed plastically in a very pronounced manner because of the creeping of the sealing material into the annular gap between lid and pot wall. Apart from that a crumbling or a pulverization of the sealing material in the region of the bead formation could be observed after longer use, so that the sealing function was considerably impaired and elastomeric components could creep through the annular gap.

Furthermore tests with glass fiber reinforcements in the sealing rings from PTFE were performed. These led to an improvement of the creep strength of the seals and to a slight rise in the friction coefficients.

The task of the invention as derived from this reality is to create an annular seal for pot-shaped supports of the species, which have not only favorable sliding properties (constant low friction coefficients against steel) and a high resistance to scuffing, but also good strength values and at the same time a high bending and torsion stiffness. This seal should also be manufacturable with less technical effort than the rings of fiberglass-reinforced PTFE mixtures which up to now have been recognized as being most suitable. In addition the annular seal should also be able to absorb the high rubber pressures of 20 to 40 N/mm$^2$ acting upon their ring inner and lower side as well as the folding bending moments arising therefrom in addition to being able to achieve a contact pressure between the ring sealing outer side and the pot wall as uniformly distributed as possible.

The seals for this task used according to the latest state of the art consist in their shape of two or three individual brass sealing rings stacked above each other with an individual cross-sectional dimensioning of height to width of 2 or 3×10 mm.

Compared to this it is now proposed to design the annular seal as an open, one-part compact ring with rectangular cross-section, which consists of PTFE-material of amorphous consistency filled with a powdery substrate. Herein the share of the filler substrate in the overall volume of the annular seal can lie between 15 and 40%, and furthermore the filler substrate can comprise a share of 50 to 100% of powdered coal.

It was seen that the annular seal of the invention has a better frictional value than the low values hitherto achieved with other materials, without tending at the same time to harmful wear because of high contact pressures as was the case with the hitherto utilized materials. Because of the low tendency towards cold flow of the coal-reinforced PTFE used for the annular seal in the invention an exceedingly small bead formation was observed also in the region of the annular gap contrary to what was the case with the sealing materials hitherto used.

Other features of the invention relate to the design of the annular seal. The hitherto known annular seals of this species have a rectangular cross-sectional shape, where the cross-section height is smaller than the cross-section width. Therefore there results an unfavorable moment of resistance against the shearing and bending forces arising in the annular gap. In view of the higher stiffness of the seal material in the invention it was recognized that with a novel dimensioning the creep strength could additionally be increased. Therefore it is proposed to dimension the cross-sectional height of the annular seal to be greater than the cross-sectional width, wherein the dimensions of the cross-sectional height of the cross-sectional width are preferably of a ratio of 8 till 12 to 6 till 10.

In order to achieve a flush contact of the annular seal against the pot wall and to thus attain a better support effect, it is furthermore proposed, that the annular seal is fabricated with observance of an external diameter oversized between 0.5 and 2 mm as against the inside diameter of the pot and that it is inserted into the pot in a state undercooled by at least 5° C. below the ambient temperature.

The essential features and advantages of the invention are furthermore discernible from the following description and explanation with the help of the embodiment example depicted in the drawing.

Figure 2:
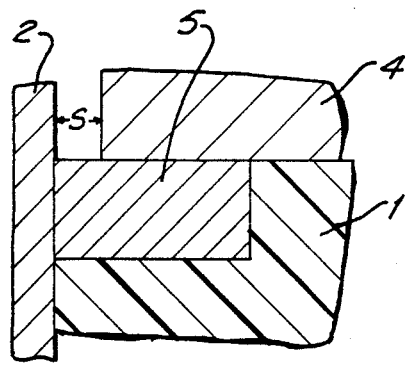
Figure 3:
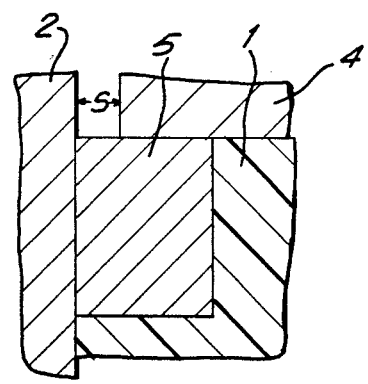
Figure 4:
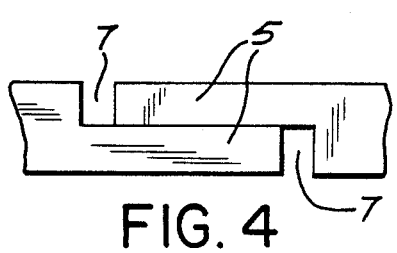

It is shown on:

FIG. 1 a species-like support in partial cross-section,
FIG. 2 the detail at X in FIG. 1,
FIG. 3 the detail at X in the embodiment according to the invention,
FIG. 4 a partial view of the sealing ring.

In the FIGS. 1 to 3 the elastomer plate 1 is inserted into the pot 2 with a pot bottom 3. The lid is designated with 4, which leaves an annular gap S with respect to the pot wall 6, in order to make tilting possible. The annular gap S is sealed by the annular seal 5, in order to prevent an escape of the elastomer. As can be discerned from FIG. 3 the cross-section of the annular seal 5 can preferably comprise a greater height than width. The overlap of the step-like butt ends 7 can be discerned from FIG. 4.

What is claimed is:

1. In a pot-shaped or bowl-shaped support for structures, especially bridge structures, including a pot having a pot wall, the pot receiving a pressure pad of elastomer upon which a lid rests which transmits the load of the structure or the bridge resting upon it to a foundation, abutment or a pillar, and in which an annular gap defined between the lid and the pot wall is sealed by means of an annular seal, the improvement comprising the annular seal (5) being an open, single part, compact ring of rectangular cross-section, the ring being of a PTFE-material of amorphous consistency filled with a powdery substrate.

2. Pot-shaped support according to claim 1, wherein the share of the filler substrate amounts to between 15 and 40% of the overall volume of the annular seal.

3. Pot-shaped support according to claim 1, wherein the filler substrate comprises a share of 50 to 100% of pulverized coal.

4. Pot-shaped support according to claim 1, wherein the annular seal (5) comprises butt-ends (7) overlapping each other in a stepped fashion or interengaging in a toothed manner.

5. Pot-shaped support according to claim 1, wherein the cross-sectional height of the annular seal (5) is greater than the cross-sectional width.

6. Pot-shaped support according to claim 5, wherein the dimensions of the cross-sectional height to the cross-sectional width of the ring (5) have a ratio of 8 till 12 to 6 till 10 to each other.

7. Pot-shaped support according to claim 1, wherein the annular seal (5) is fabricated with observance of an external diameter oversize of between 0.5 and 2 mm with respect to the pot inside diameter and is inserted into the pot (2) in a state undercooled by at least 5° C. below the ambient temperature.

* * * * *